(12) United States Patent
Amirparviz

(10) Patent No.: US 8,786,686 B1
(45) Date of Patent: Jul. 22, 2014

(54) HEAD MOUNTED DISPLAY EYEPIECE WITH INTEGRATED DEPTH SENSING

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 538 days.

(21) Appl. No.: 13/234,961

(22) Filed: Sep. 16, 2011

(51) Int. Cl.
*H04N 13/04* (2006.01)
*G09G 5/00* (2006.01)

(52) U.S. Cl.
USPC ................................ 348/58; 345/8

(58) Field of Classification Search
CPC ............... G02B 2027/0118; G02B 27/0172; G02B 5/02; G02B 5/30
USPC ........... 348/36, 42, 51, 58, 333.01; 349/11, 9, 349/96, 117, 113, 114, 65, 57, 62; 359/237, 359/462, 471, 472, 458, 485.05, 480, 7, 8
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,539,422 A | 7/1996 | Heacock et al. | |
| 5,696,521 A | 12/1997 | Robinson et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |

(Continued)

FOREIGN PATENT DOCUMENTS

GB 2272980 A 6/1994
WO WO96/05533 A1 2/1996

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Behrooz Senfi
(74) *Attorney, Agent, or Firm* — Blakely Sokoloff Taylor & Zafman LLP

(57) ABSTRACT

An eyepiece for a head mounted display includes an imaging region and a viewing region. The imaging region includes a camera. The viewing region is aligned with an eye of a user and includes a first beam splitter and a second beam splitter. The viewing region is partially transparent to pass a first portion of ambient scene light received through an ambient scene side of the eyepiece out an eye-ward side of the eyepiece. The first BS and the second BS are partially reflective and oriented to redirect offset portions of the ambient scene light received through the ambient scene side along the eyepiece towards the imaging region. The camera is positioned to capture both of the offset portions of the ambient scene light redirected by the first beam splitter and the second beam splitter.

23 Claims, 6 Drawing Sheets

(56) References Cited

U.S. PATENT DOCUMENTS

| | | |
|---|---|---|
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,723,354 B1 | 4/2004 | Ruseler-van Embden et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 6,880,931 B2 | 4/2005 | Moliton et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 * | 8/2009 | Amitai ............... 359/618 |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,791,806 B2 * | 9/2010 | Moliton et al. ............... 359/630 |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2007/0103388 A1 * | 5/2007 | Spitzer ............... 345/8 |
| 2008/0219025 A1 | 9/2008 | Spitzer et al. |
| 2008/0259750 A1 * | 10/2008 | Kadowaki et al. ......... 369/44.41 |
| 2009/0122414 A1 | 5/2009 | Amitai |
| 2010/0002154 A1 * | 1/2010 | Hua ............... 349/11 |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0157433 A1 * | 6/2010 | Mukawa et al. ............... 359/633 |
| 2010/0278480 A1 | 11/2010 | Vasylyev et al. |
| 2011/0213664 A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

HEAD MOUNTED DISPLAY EYEPIECE WITH INTEGRATED DEPTH SENSING

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method of operation for a head mounted display ("HMD") eyepiece having an expanded eyebox and depth sensing capability are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
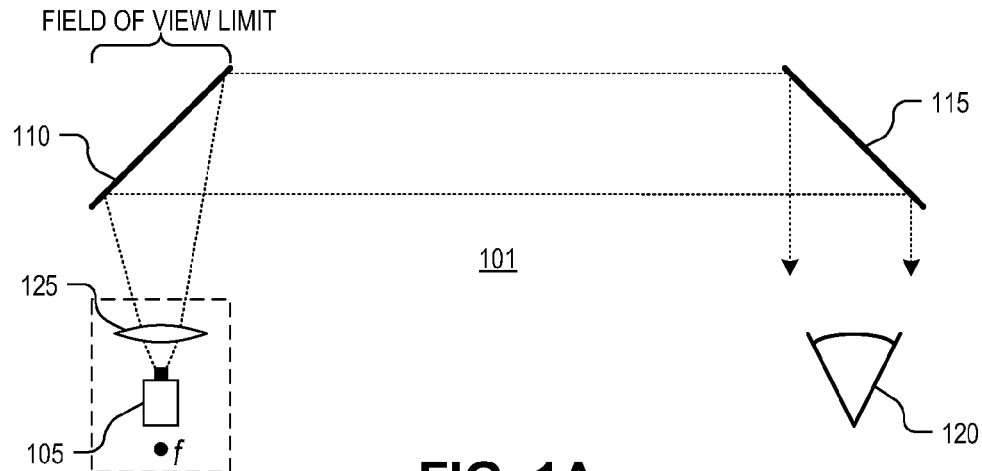
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to their eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a relatively small field of view limited by the extent of mirrors 110 and 115 and the bulkiness of lens 125. The field of view can be marginally improved by placing minors 110 and 115 within a high index material to compress the angles of incidence, but is still very limited and the thickness of the waveguide rapidly increases to achieve larger fields of view.

Figure 1B:
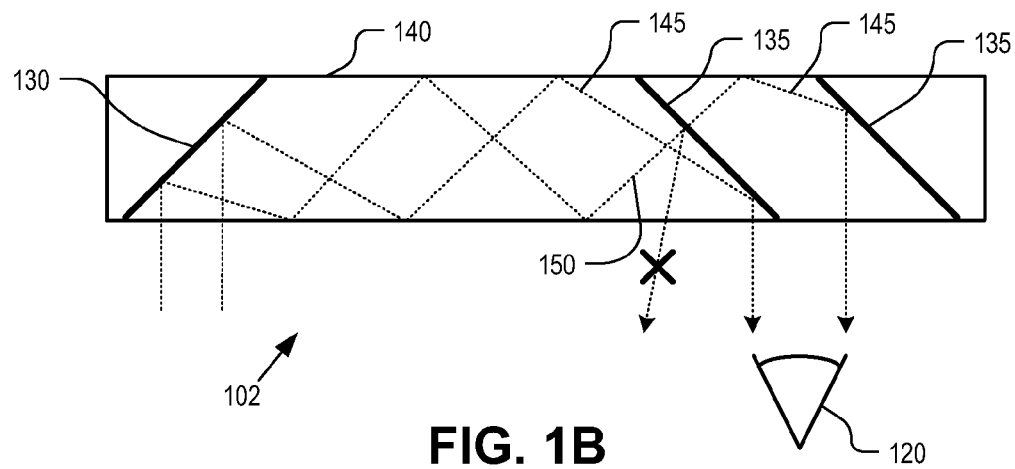
FIG. 1B illustrates a second conventional near-to-eye optical system using angle sensitive dichroic minors.

FIG. 1B illustrates a second conventional near-to-eye optical system 102 using angle sensitive dichroic minors. Optical system 102 includes a single in-coupling minor 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102 and the dichroic minor coating does not provide sharp angular cutoffs, resulting in ghosting effects.

Figure 1C:
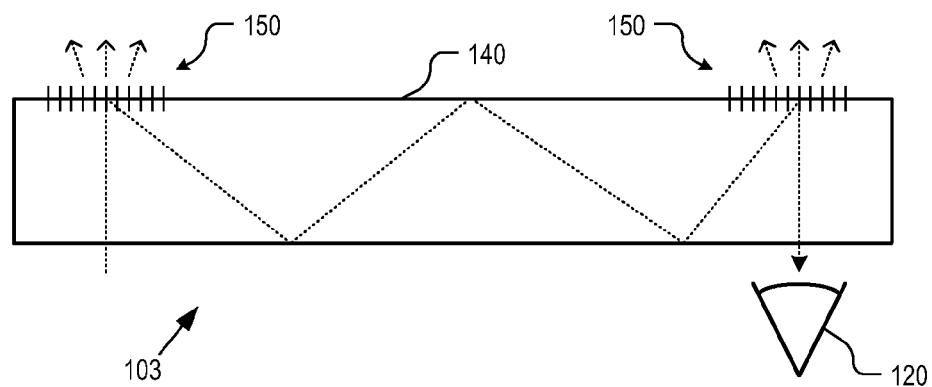
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of minors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view.

Figure 2:
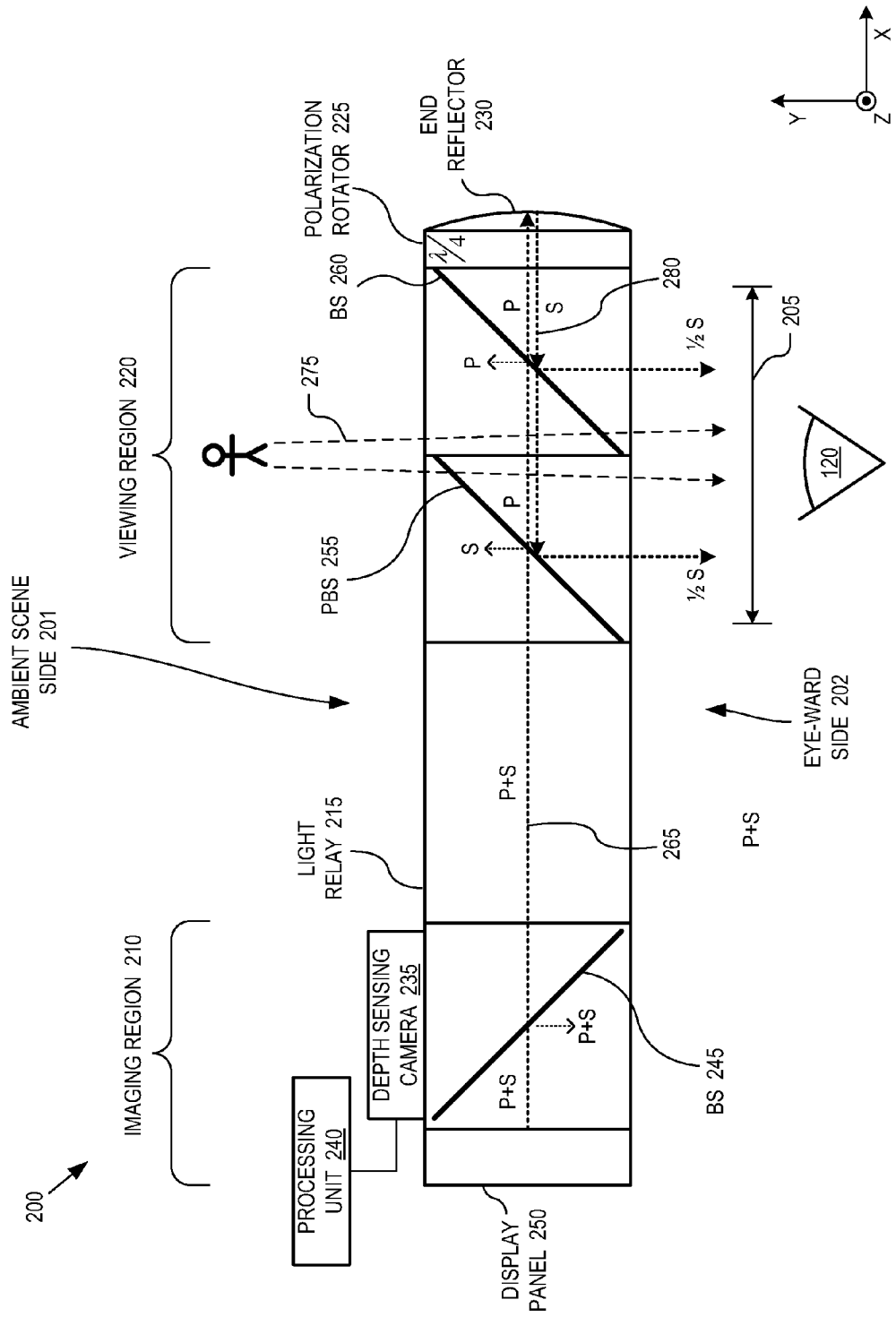
FIG. 2 is a top view of a head mounted display ("HMD") eyepiece illustrating ray tracing for outputting computer generated image ("CGI") light with an expanded and uniform illumination eyebox, in accordance with an embodiment of the disclosure.

FIG. 2 is a top cross-sectional view of a head mounted display ("HMD") eyepiece 200 illustrating ray tracing for outputting computer generated image ("CGI") light with an expanded and uniform illumination eyebox, in accordance with an embodiment of the disclosure. HMD eyepiece 200 includes dual reflective surfaces in the viewing region to expand an eyebox 205 associated with the eyepiece. The illustrated embodiment of HMD eyepiece 200 includes an imaging region 210, a light relay 215, a viewing region 220, a polarization rotator 225, and an end reflector 230. The illustrated embodiment of imaging region 210 includes a depth sensing camera 235, a processing unit 240 (which may be remotely located), a non-polarizing beam splitter ("BS") 245, and a display panel 250. The illustrated embodiment of viewing region 220 includes a polarizing beam splitter ("PBS") 255 and a non-polarizing beam splitter ("BS") 260.

Display panel 250 may be implemented as an organic light emitting diode ("OLED") panel, a back-lit liquid crystal display ("LED"), a quantum dot array, or otherwise. BS 245 may be implemented as a discrete BS block to which display panel 250 and depth sensing camera 235 are bonded. In one embodiment, BS 245 is a 50/50 beam splitter.

In the illustrated embodiment, display panel 250 is disposed on the opposite side of HMD eyepiece 200 from end reflector 230 in an opposing configuration such that it is directly facing end reflector 230. Display panel 205 launches CGI light into HMD eyepiece 200 through BS 245 along a forward propagation path 265. In one embodiment, the CGI light is directed down eyepiece 200 along forward propagation path 265 without need of total internal reflection ("TIR"). In other words, the cross sectional shape and divergence of the light cone formed by the CGI light is confined such that the light rays reach end reflector 230 without TIR off the sides of HMD eyepiece 200. In one embodiment, the light cone divergence angle (e.g., 15 degrees) may be controlled by a condenser lens (not illustrated) disposed between display panel 250 and BS 245. In one embodiment, the light cone cross-sectional shape is controlled by a blackout film aperture pattern (not illustrated). The blackout film aperture pattern may be disposed at the interface between the box volume structure of BS 245 and display panel 250, between the box volume structure of BS 245 and light relay 215, on slanted BS 245 itself, or otherwise.

Light relay 215 is disposed between imaging region 210 and viewing region 220. Light relay 215 has a transparent structure to permit the CGI light to pass through along forward propagation path 265. Light relay 215 may be fabricated of a solid transparent material (e.g., glass, quartz, acrylic, clear plastic, PMMA, ZEONEX-E48R, etc.) or be implemented as a solid housing having an inner air gap through which the CGI light passes. In one embodiment, light relay 215 has a length (as measured parallel to forward propagation path 265) selected such that the focal plane of end reflector 230 substantially coincides with an emission aperture of display panel 250. To achieve focal plane alignment with the emission aperture of display panel 250, both the length of light relay 215 and the radius of curvature of end reflector 230 may be selected in connection with each other.

The illustrated embodiment of viewing region 220 includes dual reflectors, which include PBS 255 and BS 260. In one embodiment, the dual reflectors are substantially parallel partially reflective obliquely situated planes. In one embodiment, viewing region is partially transparent, which permits ambient scene light 275 to pass through ambient scene side 201 and eye-ward side 202 of HMD eyepiece 200 to reach eye 120. A partially transparent embodiment facilitates an augmented reality ("AR") where the CGI light is superimposed over ambient scene light 275 to the user eye 120.

PBS 255 is configured to substantially pass a single linear polarization (e.g., P polarization), while substantially reflecting the other linear polarization (e.g., S polarization). BS 260 passes both linear polarizations, but only passes a portion of each linear polarization while reflecting a portion of both linear polarizations. In the illustrated embodiment, BS 260 is a 50/50 beam splitter that reflects 50% and passes 50% of incident light. The use of dual reflective elements in viewing region 220 expands eyebox 205 versus a viewing region only having a single obliquely orientated reflector. Eyebox 205 is defined by the combined projections of PBS 255 and BS 260 onto eye-ward side 202. Thus, the inclusion of multiple reflective elements in viewing region 220 permits the width (in the Y axis) of eyepiece 200 to be shrunk to achieve a desired form factor while maintaining an acceptable eyebox size. For example, the Y axis width of HMD eyepiece 200 may be half the Z axis height, or even less. In one embodiment, the Y by Z dimensions of eyepiece 200 are approximately 5 mm by 10 mm. The overall length of eyepiece 200 may be selected based upon the temple-to-eye separation distance of a typical user and/or the focal plane distance of end reflector 230. Of course other ratios and dimensions may be used.

In the illustrated embodiment, polarization rotator 225 is a quarter wave-plate polarization rotator. The CGI light is rotated 45 degrees along forward propagation path 265 and another 45 degrees along reverse propagation path 280 after reflection by end reflector 230 for a total of 90 degrees of polarization rotation. In the illustrated embodiment, end reflector 230 both reflects and collimates the CGI light such that the CGI light traveling along reverse propagation path 280 is substantially collimated and the image is virtually placed at or near infinity. As previously stated, the focal plane of end reflector 230 may be configured to coincide with the emission aperture of the image source disposed in imaging region 210. Collimating the CGI light permits eye 120 to focus on the CGI light emitted out eye-ward side 202 in a near-to-eye configuration (e.g., HMD eyepiece 200 placed within 10 cm of eye 120 and typically at or less than 5 cm of eye 120). The CGI light is directed towards eye 120 due to the oblique orientation (e.g., approximately 45 degrees relative to sides 201 and 202) of PBS 255 and BS 260.

HMD eyepiece 200 may be fabricated of a series of optically aligned but independent modules. For example, BS 245, light relay 215, PBS 255, and BS 260 may all be fabricated as independent physical elements that are jointed together. In one embodiment, PBS 255 and BS 260 may be integrated into one physical component with the two reflective surfaces coated onto opposite sides of this single physical component. These independent physical elements (e.g., volume boxes, cubes, etc.) may share a common cross-sectional shape facilitating a butt connection at planar interface surfaces. In one embodiment, these independent physical elements may be disposed on a single substrate or even sandwiched between upper and lower substrates (not illustrated). These substrates may facilitate optical alignment on a planar surface. Furthermore, fine tuning of the optical alignment between the focal plane of end reflector 230 and the emission aperture of display panel 250 can be achieved during placement of the physical components on one or two substrates. For example, air gaps can be introduced between light relay 215 and BS 245 and/or PBS 255 to achieve the correct separation distance between end reflector 230 and display panel 250.

Figure 3:
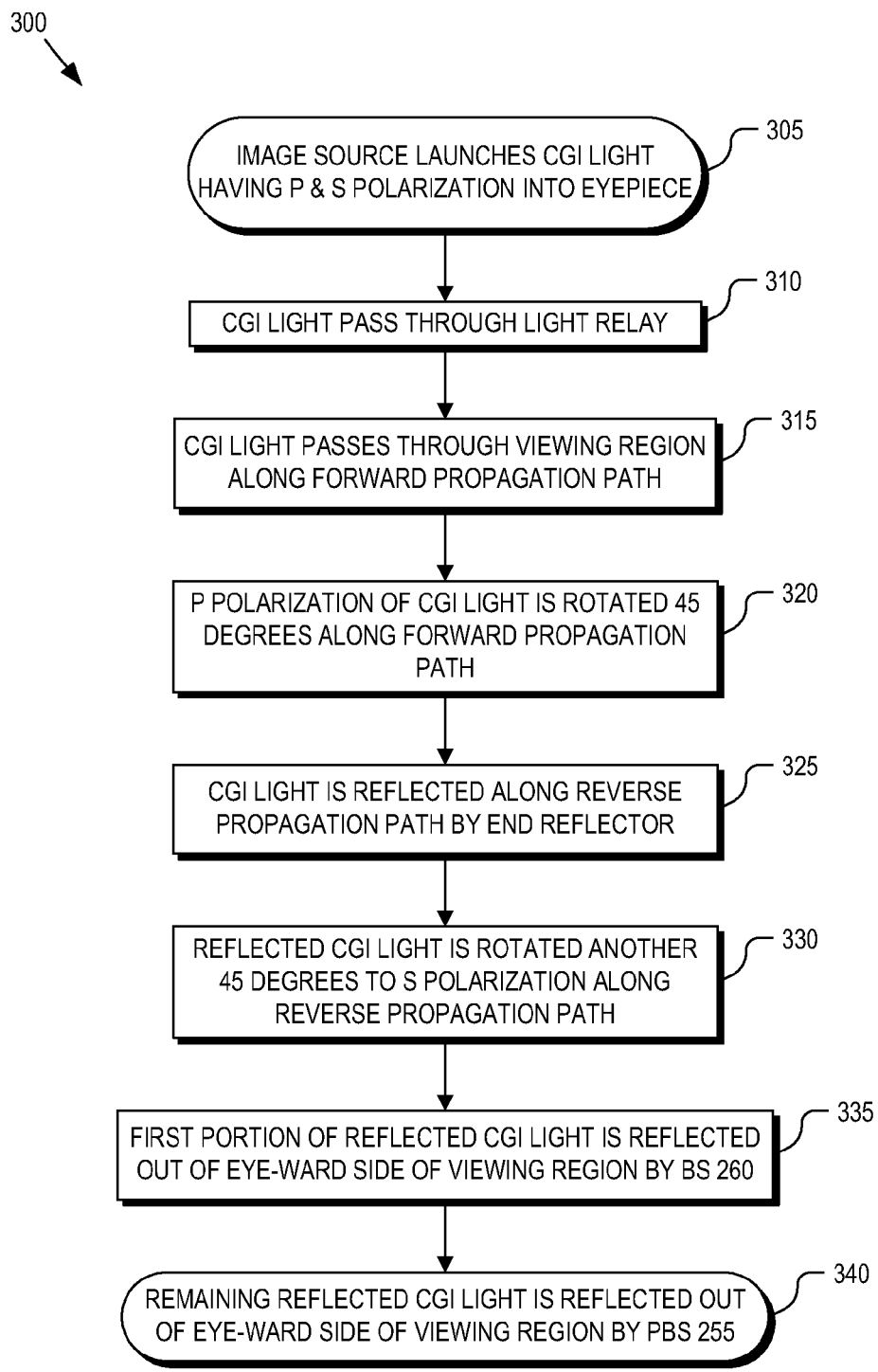
FIG. 3 is a flow chart illustrating a process of operation of the HMD eyepiece to output the CGI light, in accordance with an embodiment of the disclosure.

FIG. 3 is a flow chart illustrating a process 300 of operation of eyepiece 200 to deliver a near-to-eye image (e.g., CGI light) to a user, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, display panel 250 launches the CGI light through BS 245 into light relay 215 traveling along forward propagation path 265. BS 245 passes a portion of both the P and S polarization components while reflecting a portion of both the S and P polarization components. In one embodiment, BS 245 is a 50/50 beam splitter. In other embodiments, BS 245 may reflect greater than 50 percent or reflect less than 50% of impinging light.

In a process block 310, the CGI light passes through light relay 215. In one embodiment, light relay 215 merely provides a separation offset between the image source (i.e., display panel 250) and end reflector 230 and does not operate to confine or guide the light wave. Thus, in these embodiments, the CGI light passes through light relay 215 without TIR and without external surface reflections.

In a process block 315, the CGI light passes through viewing region 220 along forward propagation path 265. Since PBS 255 is configured to substantially pass P polarized light, the P polarization component of the CGI light passes through PBS 255 towards BS 260 while the S polarization component is substantially blocked. In the illustrated embodiment, BS 260 is a 50/50 beam splitter and therefore 50% of the remaining CGI light is reflected towards ambient scene side 201 while the other 50% passes through towards polarization rotator 225.

In a process block 320, the CGI light then passes through polarization rotator 225 along forward propagation path 265. In so doing, the polarization of the CGI light is rotated by 45 degrees since the illustrated embodiment of polarization rotator 225 is a quarter wave-plate rotator.

In a process block 325, the CGI light is reflected back along reverse propagation path 280 by end reflector 230. In one embodiment, end reflector 230 is a collimating reflector. Thus, in this embodiment, the CGI light travelling along reverse propagation path 280 is substantially collimated light. Collimating the CGI light has an effect of virtually displacing the CGI image at or near infinity thereby enabling the human eye 120 to bring the CGI image into focus. Collimating the CGI light also reduces or eliminates image ghosting created by reflections off of the parallel dual reflectors.

In a process block 330, the reflected CGI light traveling along reverse propagation path 280 once again passes through polarization rotator 225, causing the CGI light to be rotated another 45 degrees for a total of 90 degrees from the forward and reverse propagation paths. Thus, after passing through polarization rotator 225 for the second time, the CGI light has an S polarization.

In a process block 335, half of the CGI light having the S polarization is reflected by BS 260 and redirected out of HMD eyepiece 200 through eye-ward side 202 towards eye 120. The remaining half of the CGI light continues to PBS 255, which is configured to reflect substantially all S polarization light. Therefore, the remaining CGI light is reflected by PBS 255 and redirected out of HMD eyepiece 200 through eye-ward side 202 towards eye 120 (process block 340). Since BS 260 redirects 50% of the CGI light traveling along reverse propagation path 280 and PBS 255 redirects substantially all of the remaining CGI light that passes through BS 260 along reverse propagation path 280, the CGI light emitted through eye-ward side 202 of eyepiece 200 in viewing region 220 has a substantially uniform intensity.

Figure 4:
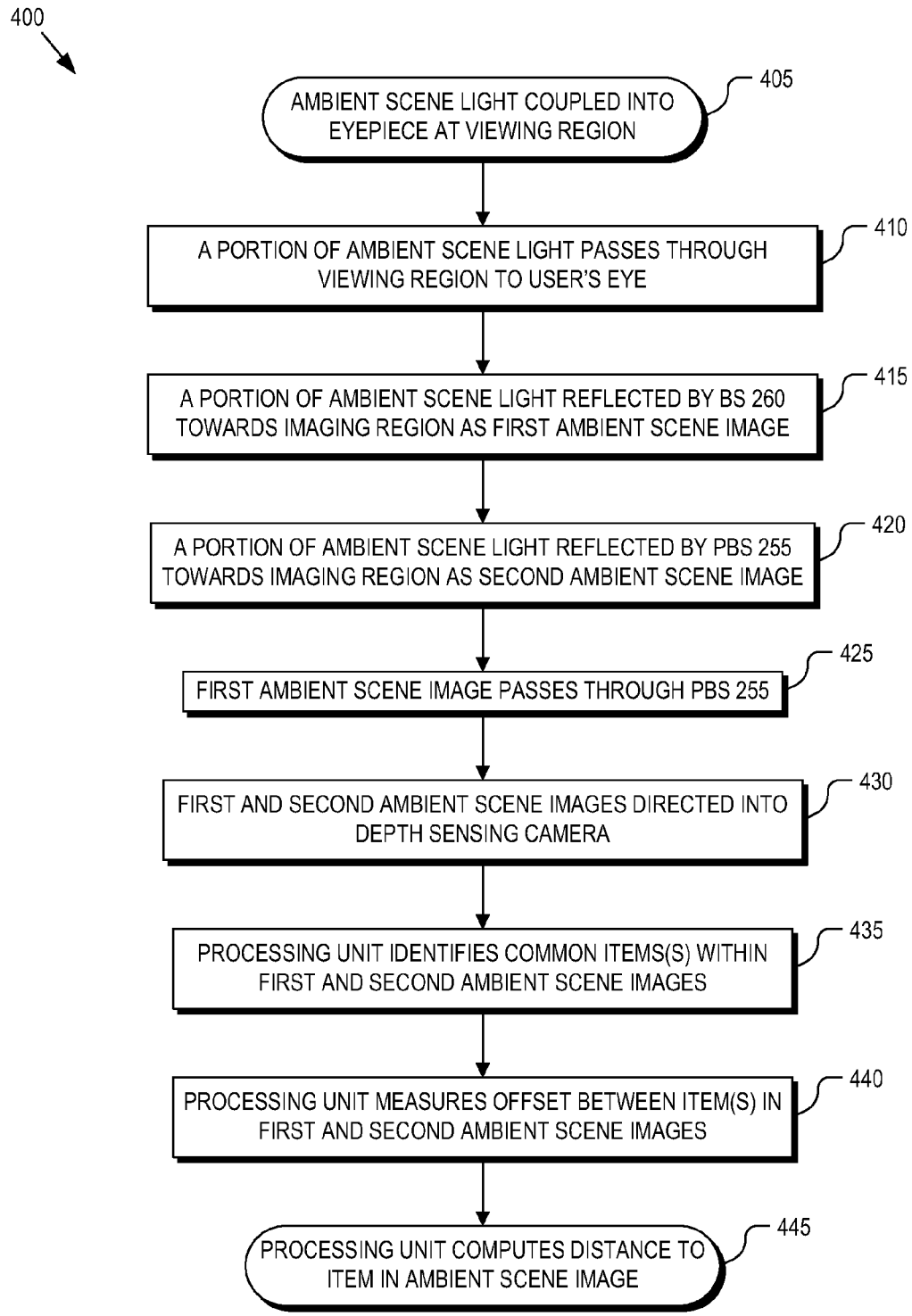
FIG. 4 is a flow chart illustrating a process for depth sensing of an item portrayed in ambient scene light received at the viewing region of the HMD eyepiece, in accordance with an embodiment of the disclosure.
Figure 5:
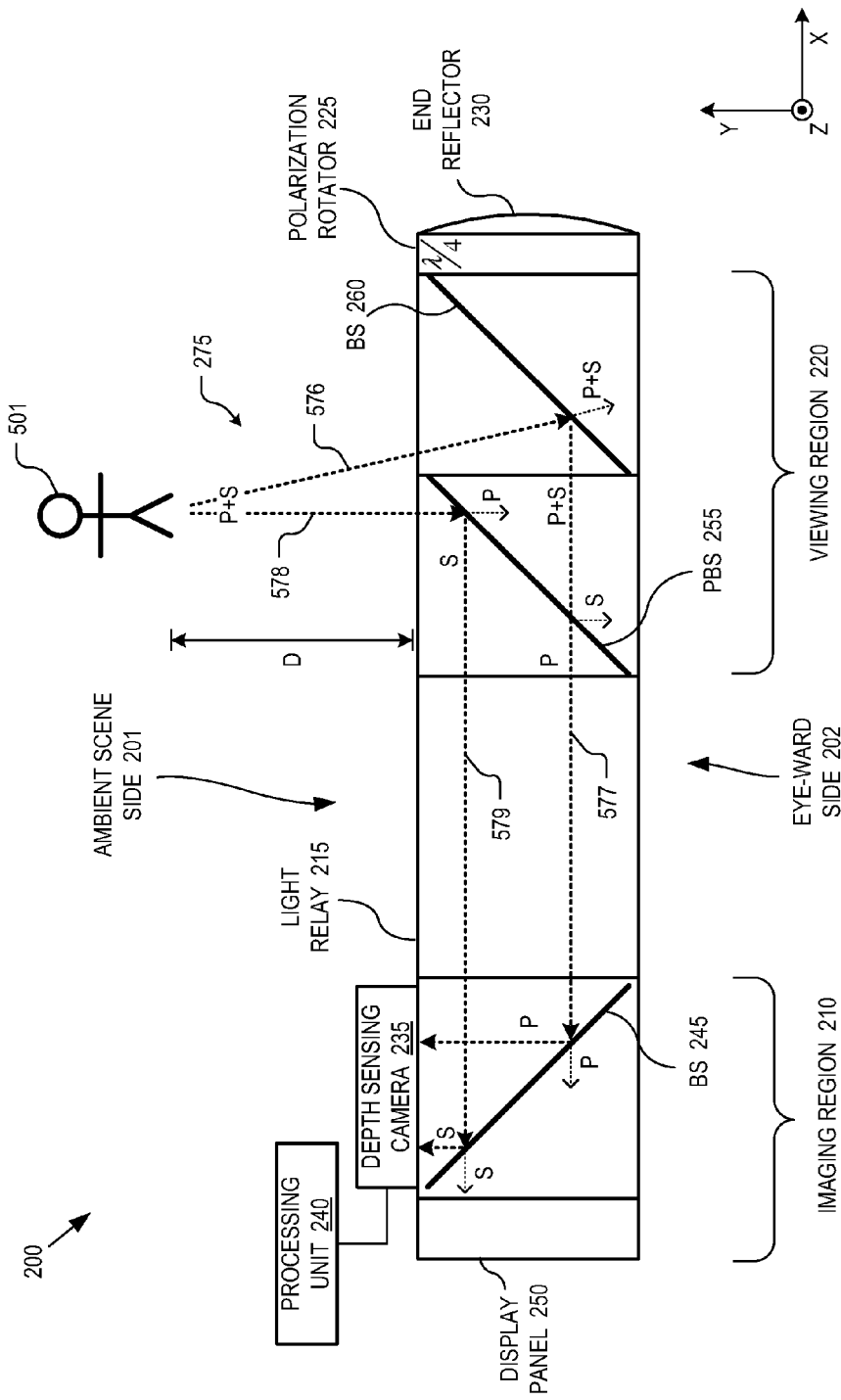
FIG. 5 is a top view of the HMD eyepiece illustrating ray tracing during depth sensing operation, in accordance with an embodiment of the disclosure.

FIG. 4 is a flow chart illustrating a process 400 for depth sensing of an item portrayed in ambient scene light 275 received at the viewing region 220 of HMD eyepiece 200, in accordance with an embodiment of the disclosure. Process 400 is discussed with reference to FIG. 5, which includes a cross-sectional top view of HMD eyepiece 200 illustrating ray tracing during depth sensing operation. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, ambient scene light 275 is coupled into HMD eyepiece 200 through ambient scene side 201 in viewing region 220. Since viewing region 220 is partially transparent, a portion of ambient scene light 275 passes through viewing region 220, including PBS 255 and BS 260, and out eye-ward side 202 to eye 120 (process block 410). In this manner, a user of HMD eyepiece 200 is capable of seeing ambient scene light 275 through viewing region 220.

However, viewing region 220 is only partially transparent and as such a portion of ambient scene light 275 is redirected by PBS 255 and BS 260 down HMD eyepiece 200 between ambient scene side 201 and eye-ward side 202 towards imaging region 210. In a process block 415, a first portion 576 of ambient scene light 275 is reflected by BS 260 towards imaging region 210 as ambient scene image 577. In a process block 420, a second portion 578 of ambient scene light 275 is reflected by PBS 255 towards imaging region 210 as ambient scene image 579. In the illustrated embodiment, PBS 255 and BS 260 are substantially parallel but offset from each other. Therefore, ambient scene images 577 and 579 will also be offset or displaced from each other due to the slightly different angles that ambient scene light 275 will strike the two reflective surfaces (i.e., PBS 255 and BS 260). The offset angle and thus the magnitude of offset between ambient scene images 577 and 579 will changed dependent upon the distance D between an item 501 (e.g., person, place, or thing) portrayed within ambient scene light 275 and HMD eyepiece 200.

In a process block 425, ambient scene image 577, which was redirected by BS 260, passes through PBS 255 on its optical path to imaging region 210. Since PBS 255 is partially reflective and partially transparent to unpolarized light, one polarization component will pass through (e.g., P polarization is transmitted), while the other polarization component will be rejected (e.g., S polarization is reflected). Thus, in the illustrated embodiment, ambient scene image 579 includes substantially just S polarized light while ambient scene image 577 includes substantially just P polarized light. Of course, in other embodiments, depending upon the reflective/transmissive characteristics of PBS 255 ambient scene images 577 and 579 may have reversed polarizations than those illustrated in FIG. 5.

Once ambient scene images 577 and 579 reach imaging region 210, they are directed into depth sensing camera 235 (process block 430). In the illustrated embodiment, BS 245 is positioned within imaging region 210 and having an orientation (e.g., 45 degree slant) to redirect ambient scene images 577 and 579 into depth sensing camera 235. Since BS 245 is partially reflective, in the illustrated embodiment, just portions (e.g., 50% portions) of each ambient scene image 577 and 579 are redirected into depth sensing camera 235.

In a process block 435, the ambient scene images 577 and 579 captured by depth sensing camera 235 are analyzed by processing unit 240. Processing unit 240 analyzes ambient scene images 577 and 579 to register the two images to one another by identifying one or more common items in the two images. Identifying a common item(s) may include identifying shapes, colors, points of high contrast, or otherwise. These identifiable points or items within the two ambient scene images 577 and 579 may be generically referred to as high image gradient locations. These high image gradient locations help in registering the two offset ambient scene images 577 and 579. Once the images are registered to one another, processing unit 240 measures the magnitude of the offset between the common item portrayed in both ambient scene images 577 and 579 (process block 440). In a process block 445, the magnitude of the offset is then correlated to an estimated distance D between item 501 portrayed by ambient scene light 275 and HMD eyepiece 200 (process block 445). If ambient scene light 275 includes multiple different identifiable items located at different distances from HMD eyepiece 200, then a different estimated distance D may be computed for each identified item, and optionally a mean or median of the computed distances may be used. Once the distance D to item 501 is computed, the distance D can be used to alter or otherwise inform the CGI light output by display panel 250 and rendered to the user via augmentation over ambient scene light 275. For example, the computed distance D may be used to alter the size or virtual zoom of CGI displayed to the user.

Figure 6:
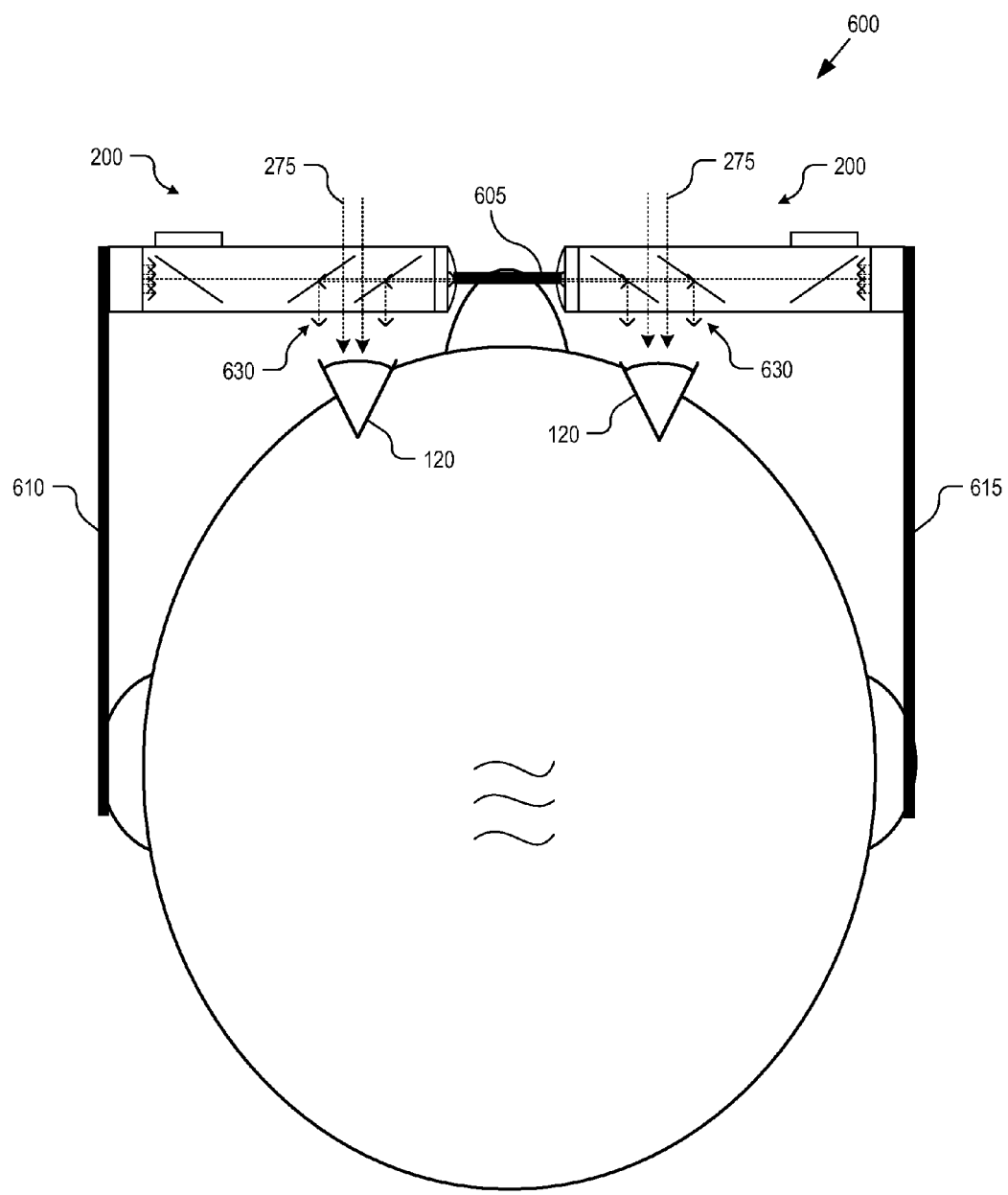
FIG. 6 is a top view of a binocular HMD having expanded eyeboxes and depth sensing capability, in accordance with an embodiment of the disclosure.

FIG. 6 is a top view of a head mounted display ("HMD") 600 using a pair of near-to-eye optical systems 601, in accordance with an embodiment of the disclosure. Each near-to-eye optical system 601 may be implemented with embodiments of HMD eyepiece 200. The near-to-eye optical systems 601 are mounted to a frame assembly, which includes a nose bridge 605, left ear arm 610, and right ear arm 615. Although FIG. 6 illustrates a binocular embodiment, HMD 600 may also be implemented as a monocular HMD using only a single HMD eyepiece in front of one eye.

The two near-to-eye optical systems 601 are secured into an eye glass arrangement that can be worn on the head of a user. The left and right ear arms 610 and 615 rest over the user's ears while nose assembly 605 rests over the user's nose. The frame assembly is shaped and sized to position a viewing region 220 in front of a corresponding eye 120 of the user. Of course, other frame assemblies may be used (e.g., single member, contiguous visor, integrated headband or goggles type eyewear, etc.).

The illustrated embodiment of HMD 600 is capable of displaying an augmented reality to the user. The viewing region of each eyepiece permits the user to see a real world image via ambient scene light 275. Left and right (binocular embodiment) CGI light 630 may be generated by one or two CGI engines (not illustrated) coupled to a respective image source of the eyepieces. CGI light 630 is seen by the user as virtual images superimposed over the real world as an augmented reality. One or both of near-to-eye optical systems 601 may include depth sensing camera 235 and processing unit 240. Depth sensing may be used to provide real-time feedback to display panel 250 to alter the position, size, or virtual zoom of the CGI displayed to the user based upon the separation distance of items in the user's view of the ambient scene beyond the HMD eyepiece. Since the depth sensing operates by splitter off a portion of ambient scene light 275 passing through viewing region 220, depth sensing camera 235 is recording portions of the same light rays perceived by eye 120—as opposed to light rays received at a peripheral location on HMD eyepiece 200 for improved accuracy.

Some of the process blocks explained above may be described in terms of computer software and hardware. The techniques described may constitute machine-executable instructions (e.g., logic) embodied within a tangible machine (e.g., computer) readable storage medium, that when executed by a machine will cause the machine to perform the operations described. Additionally, the processes may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
    an imaging region including a camera; and
    a viewing region to be aligned with an eye of a user and including a first beam splitter ("BS") and a second BS, wherein the viewing region is partially transparent to pass a first portion of ambient scene light received through an ambient scene side of the eyepiece out an eye-ward side of the eyepiece, wherein the first BS and the second BS are partially reflective and oriented to redirect offset portions of the ambient scene light received through the ambient scene side along the eyepiece towards the imaging region,
    wherein the camera is positioned to capture both of the offset portions of the ambient scene light redirected by the first BS and the second BS.

2. The eyepiece of claim 1, further comprising a processing unit coupled to the camera and including logic to analyze the offset portions of the ambient scene light to determine a distance between the eyepiece and an item portrayed within the ambient scene light.

3. The eyepiece of claim 2, wherein the logic includes further logic to:
    identify the item within the ambient scene light;
    measure a magnitude of an offset between the offset portions of the ambient scene light; and determine the distance between the eyepiece and the item based at least in part upon the magnitude of the offset between the offset portions of the ambient scene light.

4. The eyepiece of claim 1, further comprising:
a third BS disposed within the imaging region and oriented to redirect the offset portions of the ambient scene light received from the first BS and the second BS into the camera;
an image source disposed at the imaging region for launching computer generated image ("CGI") light along a forward propagating path within the eyepiece; and
an end reflector disposed at an opposite end of the eyepiece from the imaging region to reflect the CGI light back along a reverse propagation path,
wherein the first BS and the second BS redirect the CGI light traveling along the reverse propagation path out of the eye-ward side of the eyepiece.

5. The eyepiece of claim 4, wherein the first BS comprises a polarizing beam splitter and the second BS and the third BS each comprise a non-polarizing beam splitter, wherein the first BS is disposed between the second BS and the third BS.

6. The eyepiece of claim 5, further comprising:
a polarization rotator disposed in the forward and reverse propagation paths of the CGI light between the viewing region and the end reflector.

7. The eyepiece of claim 6, wherein the polarization rotator comprises a quarter wave-plate polarization rotator.

8. The eyepiece of claim 4, wherein the first BS and second BS are offset from each other and orientated substantially parallel to each other and have reflectivities selected to reflect substantially equal intensities of the CGI light out of the eye-ward side of the eyepiece.

9. The eyepiece of claim 4, wherein the image source comprises one of a organic light emitting diode ("OLED") panel, a back-lit liquid crystal display ("LCD") panel, or a quantum dot array.

10. The eyepiece of claim 4, wherein the end reflector comprises a concave reflective surface, the eyepiece further comprising:
a light relay disposed between the viewing region and imaging region, the light relay having a length selected to substantially position an emission aperture of the light source at a focal plane of the end reflector,
wherein the end reflector substantially collimates the CGI light reflected along the reverse propagation path.

11. A head mounted display comprising:
an eyepiece including:
an imaging region including an imaging source, a first beam splitter ("BS"), and a camera, the imaging source for launching computer generated image ("CGI") light along a forward propagating path within the eyepiece;
an end reflector disposed at an opposite end of the eyepiece from the imaging region to reflect the CGI back along a reverse propagation path within the eyepiece; and
a viewing region to be aligned with an eye of a user, the viewing region disposed between the imaging region and the end reflector and including a second BS and a third BS, the viewing region to redirect the CGI light from the reverse propagation path out of an eye-ward side of the eyepiece,
wherein the second and third BS of the viewing region each redirect offset portions of ambient scene light received through an ambient scene side of the eyepiece in the viewing region back to the imaging region and the first BS positioned to reflect the offset portions of the ambient light into the camera; and
a frame assembly to support the eyepiece for wearing on a head of the user with the viewing region positioned in front of the eye of the user.

12. The head mounted display of claim 11, further comprising a processing unit coupled to the camera and including logic to analyze the offset portions of the ambient scene light to determine a distance between the eyepiece and an item portrayed within the ambient scene light.

13. The head mounted display of claim 12, wherein the logic includes further logic to:
identify the item within the ambient scene light;
measure a magnitude of an offset between the offset portions of the ambient scene light; and
determine the distance between the eyepiece and the item based at least in part upon the magnitude of the offset between the offset portions of the ambient scene light.

14. The head mounted display of claim 11, wherein the second BS comprises a polarizing beam splitter and the first BS and the second BS each comprise a non-polarizing beam splitter, wherein the second BS is disposed between the first BS and the third BS within the eyepiece.

15. The head mounted display of claim 14, further comprising:
a polarization rotator disposed in the forward and reverse propagation paths of the CGI light between the viewing region and the end reflector.

16. The head mounted display of claim 14, wherein the first BS and second BS are offset from each other and orientated substantially parallel to each other and have reflectivities selected to reflect substantially equal intensities of the CGI light out of the eye-ward side of the eyepiece.

17. The head mounted display of claim 16, wherein the end reflector comprises a concave reflective surface, the eyepiece further comprising:
a light relay disposed between the viewing region and imaging region, the light relay having a length selected to substantially position an emission aperture of the light source at a focal plane of the end reflector,
wherein the end reflector substantially collimates the CGI light reflected along the reverse propagation path.

18. A method of operation of a head mounted display ("HMD") eyepiece having an ambient scene side and an eye-ward side, the method comprising:
passing a first portion of ambient scene light received at a viewing region of the HMD eyepiece through the ambient scene side and the eye-ward side so that the user can view the ambient scene light;
redirecting a second portion of the ambient scene light as a first ambient scene image by a first beam splitter ("BS") disposed within the viewing region, the first ambient scene image redirected down the HMD eyepiece between the ambient scene side and the eye-ward side towards an imaging region of the HMD eyepiece;
redirecting a third portion of the ambient scene light as a second ambient scene image by a second BS disposed within the viewing region and offset from the first BS;
coupling the first and second ambient scene images into a depth sensing camera mounted proximate to the imaging region of the HMD eyepiece; and
determining a distance to an item portrayed in the first and second ambient scene images based upon an offset between the first and second ambient scene images.

19. The method of claim 18, wherein determining the distance to the item comprises:

identifying the same item in the first and second ambient scene images;

measuring a magnitude of the offset between the same item in the first and second ambient scene images; and determine the distance between the HMD eyepiece and the item based at least in part upon the magnitude of the offset between the first and second ambient scene images.

20. The method of claim 18, wherein the item is viewed by the user in the first portion of the ambient scene light while the determining the distance to the item is executed.

21. The method of claim 18, further comprising launching computer generated image ("CGI") light into the HMD eyepiece along a forward propagation path with an image source mounted to the imaging region, wherein the forward propagation path extends through the viewing region between the ambient scene side and the eye-ward side;

reflecting the CGI light along a reverse propagation path with an end reflector disposed adjacent to the viewing region;

redirecting a first portion of the CGI light traveling along the reverse propagation path out the eye-ward side with the second BS and redirecting a second portion of the CGI light traveling along the reverse propagation path out the eye-ward side with the first BS such that the CGI light is superimposed over the first portion of the ambient scene light viewed by the user.

22. The method of claim 21, wherein the first beam splitter comprises a polarizing beam splitter, the second beam splitter comprises a non-polarizing beam splitter, and the first beam splitter is disposed between the imaging region and the second beam splitter, the method further comprising:

rotating the CGI light with a polarization rotator disposed between the viewing region and the end reflector as the CGI light travels along the forward and reverse propagation paths.

23. The method of claim 22, wherein coupling the first and second ambient scene images into a depth sensing camera mounted proximate to the imaging region of the HMD eyepiece; comprises:

redirecting portions of the first and second ambient scene images into the depth sensing camera using another non-polarizing beam splitter disposed within the imaging region of the HMD eyepiece.

\* \* \* \* \*